(12) United States Patent
Xu

(10) Patent No.: US 10,196,965 B1
(45) Date of Patent: Feb. 5, 2019

(54) CHARGE AIR COOLER FOR INTERNAL COMBUSTION ENGINE

(71) Applicant: Thermal Cooling Technology LLC, Houston, TX (US)

(72) Inventor: Jiaju Xu, Houston, TX (US)

(73) Assignee: Thermal Cooling Technology LLC, Houston, TX (US)

( * ) Notice: Subject to any disclaimer, the term of this patent is extended or adjusted under 35 U.S.C. 154(b) by 0 days.

(21) Appl. No.: 15/989,995

(22) Filed: May 25, 2018

Related U.S. Application Data

(63) Continuation of application No. 15/921,250, filed on Mar. 14, 2018.

(51) Int. Cl.
| | |
|---|---|
| *F02B 29/04* | (2006.01) |
| *F28F 9/16* | (2006.01) |
| *B23K 1/00* | (2006.01) |
| *B32B 9/00* | (2006.01) |
| *B32B 17/06* | (2006.01) |
| *B32B 33/00* | (2006.01) |
| *B32B 27/40* | (2006.01) |

(Continued)

(52) U.S. Cl.
CPC .......... *F02B 29/045* (2013.01); *B23K 1/0012* (2013.01); *B32B 9/007* (2013.01); *B32B 17/06* (2013.01); *B32B 27/40* (2013.01); *B32B 33/00* (2013.01); *F28F 9/162* (2013.01); *B23K 2101/06* (2018.08); *B23K 2103/10* (2018.08); *B32B 2307/704* (2013.01); *F28F 2275/04* (2013.01); *F28F 2280/00* (2013.01)

(58) Field of Classification Search
CPC .......... F02B 29/045; F28F 9/02; F28F 9/162; B23K 35/3607; B23K 1/0012; B21D 53/08; B32B 9/007; B32B 17/06; B32B 27/40; B32B 33/00
USPC ........................................................ 165/173
See application file for complete search history.

(56) References Cited

U.S. PATENT DOCUMENTS

| | | | | |
|---|---|---|---|---|
| 4,146,164 | A * | 3/1979 | Anderson | B23K 20/04 228/158 |
| 5,180,098 | A * | 1/1993 | Halstead | B23K 1/0012 228/183 |

(Continued)

*Primary Examiner* — Tho V Duong

(57) ABSTRACT

The present disclosure generally provides an improved punctured type main header of an internal combustion engine CAC. In one embodiment, the punctured type main header includes a body having multiple mounting holes disposed in the length direction of the main header, wherein each mounting hole has a sidewall. The body includes an aluminum tube coupled to each mounting hole, a first feature layer formed on the sidewall of each mounting hole, wherein the first feature layer has gas bubbles formed therein, a second feature layer formed on the first feature layer, the second feature layer is a high performance material (HPM) produced from raw ceramic powders of $Y_2O_3$, $Al_2O_3$, and $ZrO_2$, wherein $Y_2O_3$ is in a range between about 45 mol. % and about 100 mol. %, $ZrO_2$ is in a range from about 0 mol. % and about 55 mol. %, and $Al_2O_3$ is in a range from about 0 mol. % to about 10 mol. %. The body further includes a solder coating formed on the second feature layer.

5 Claims, 8 Drawing Sheets

ENLARGED VIEW OF B IN FIG. 3

(51) Int. Cl.
   *B23K 101/06*      (2006.01)
   *B23K 103/10*      (2006.01)

(56) References Cited

U.S. PATENT DOCUMENTS

| | | | | |
|---|---|---|---|---|
| 5,228,512 | A * | 7/1993 | Bretl | F28F 9/18 |
| | | | | 165/153 |
| 5,251,374 | A * | 10/1993 | Halstead | B23K 1/0012 |
| | | | | 228/183 |
| 5,450,666 | A * | 9/1995 | Conn | B23K 35/3605 |
| | | | | 148/23 |
| 6,446,337 | B1 * | 9/2002 | Halm | F28F 9/182 |
| | | | | 29/527.2 |
| 7,413,006 | B2 * | 8/2008 | DeGroot | F28F 9/04 |
| | | | | 165/173 |

* cited by examiner

ENLARGED VIEW OF B IN FIG. 3

CHARGE AIR COOLER FOR INTERNAL COMBUSTION ENGINE

CROSS-REFERENCE TO RELATED APPLICATIONS

This application claims priority to U.S. patent application Ser. No. 15/921,250, filed Mar. 14, 2018, which is herein incorporated by reference.

FIELD

The present disclosure relates to a core body main header of an internal combustion engine charge air cooler ("CAC"), and in particular, to a punctured type main header of an internal combustion engine charge air cooler.

BACKGROUND

Charge air cooler, also referred to in the transportation industry as intercooler, is an important component of the internal combustion engine cooling system. The role of the CAC is to reduce the engine inlet temperature, increase the intake density, improve fuel utilization, and reduce emissions of toxic and harmful gases. If the charge air cooler has poor cooling performance or leakage, the service life of the internal combustion engine will be directly affected, even to the point that an expanding cylinder may fail. The structure of a main header is an important component of a core body of the charge air cooler, and its brazing strength with tubes directly affect the sealing performance and reliability. Therefore, the design of the main header is profoundly important.

SUMMARY

To solve the leakage problems in the structure of the conventional main header, an objective of the present disclosure is to provide an improved punctured type main header of an internal combustion engine charge air cooler. In one embodiment, the punctured type main header includes a body having multiple mounting holes disposed in the length direction of the main header, wherein each mounting hole has an elongated sidewall formed by a die stretching process. The body includes an aluminum tube coupled to each mounting hole, a first feature layer formed on the elongated sidewall of each mounting hole, wherein the first feature layer has gas bubbles formed therein, a second feature layer formed on the first feature layer, the second feature layer is a high performance material (HPM) produced from raw ceramic powders of $Y_2O_3$, $Al_2O_3$, and $ZrO_2$, wherein $Y_2O_3$ is in a range between about 45 mol. % and about 100 mol. %, $ZrO_2$ is in a range from about 0 mol. % and about 55 mol. %, and $Al_2O_3$ is in a range from about 0 mol. % to about 10 mol. %. The body further includes a solder coating formed on the second feature layer.

In another embodiment, a method for forming a punctured type main header of an internal combustion engine CAC is provided. The method includes forming a plurality of mounting holes in the length direction of a body, wherein each mounting hole having a sidewall, stretching the plurality of mounting holes by a die stretching process to convert the sidewall into an elongated sidewall, forming a first feature layer on the elongated sidewall of each mounting hole, wherein the first feature layer has gaseous species formed therein, forming a second feature layer on the first feature layer, wherein the second feature layer is a high performance material (HPM) produced from raw ceramic powders, forming a solder coating on the second feature layer, and brazing each of the plurality of the mounting holes to an aluminum tube.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

Figure 1:
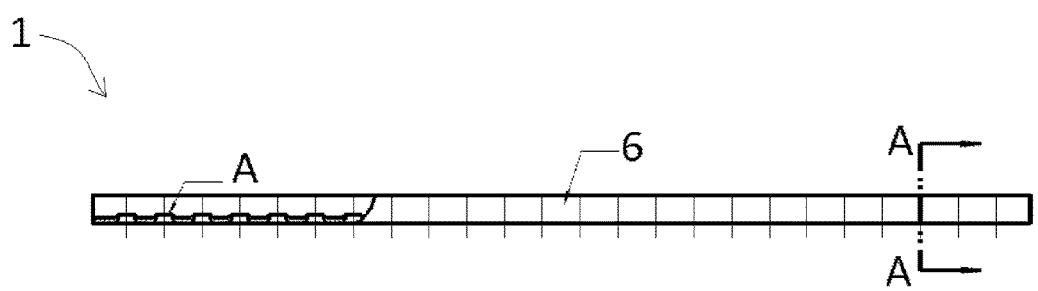
FIGS. 1 to 5 illustrate the structure and mounting of a main header of a CAC of a conventional internal combustion engine.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Figure 2:
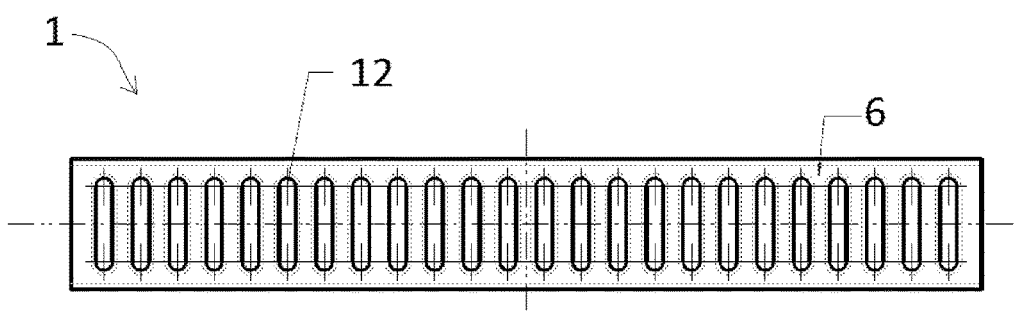
Figure 3:
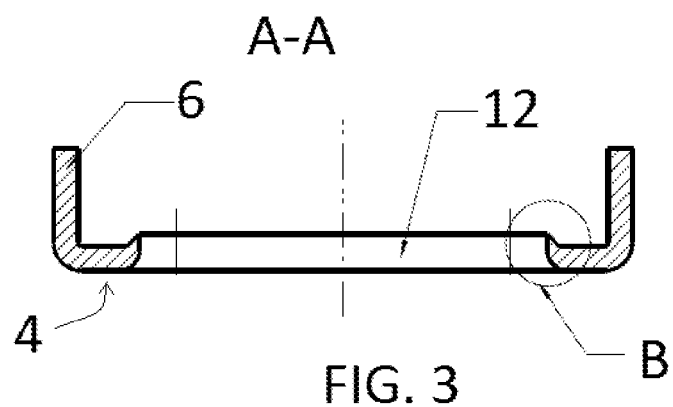
Figure 4:
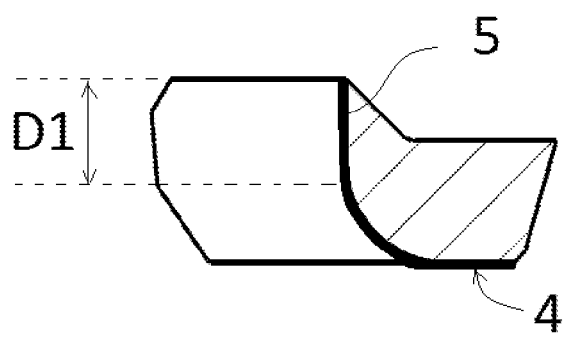
Figure 5:
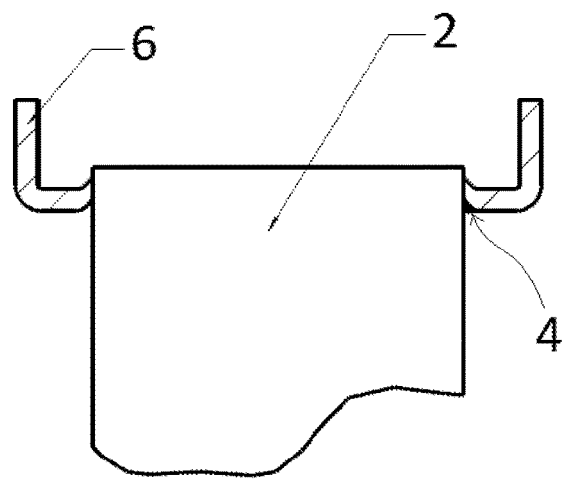

FIGS. 1 to 5 illustrate the structure and mounting of a main header 1 of a CAC of a conventional internal combustion engine. FIG. 1 is a cross-sectional view of a main header 1. FIG. 2 is a top view of the main header 1 of FIG. 1. FIG. 3 shows an enlarged view of area "A" in FIG. 1. FIG. 4 shows an enlarged view of area "B" in FIG. 3. As can be seen in FIG. 1, the main header 1 generally has one or more mounting holes 12 formed through the body 6 of the main header 1. The mounting holes 12 are formed by punching. A main header 1 is then assembled with an aluminum tube 2 (FIG. 5) by inserting the aluminum tube 5 into the mounting holes 12. After the assembly, the main header 6 and the aluminum tube 5 are subjected to a brazing process so that a solder coating 4 on the exposed surface of the main header 6 is melted and forms a solder to connect the main header 6 (FIG. 5) to the aluminum tube, thereby forming into one piece.

In the conventional design, the sidewall 5 of the mounting holes 12 has limited surface area (FIG. 4). This could be problematic since the main header 1 and the aluminum tube 2 are connected together through only a small amount of surface area. Such a small brazed area provides poor connection strength and can cause CAC leakage due to cracking and peeling of the solder from the main header when an automobile drives on a bumpy road. The present inventor has proposed various approaches to address these issues, as will be discussed in further detail below.

Figure 6:
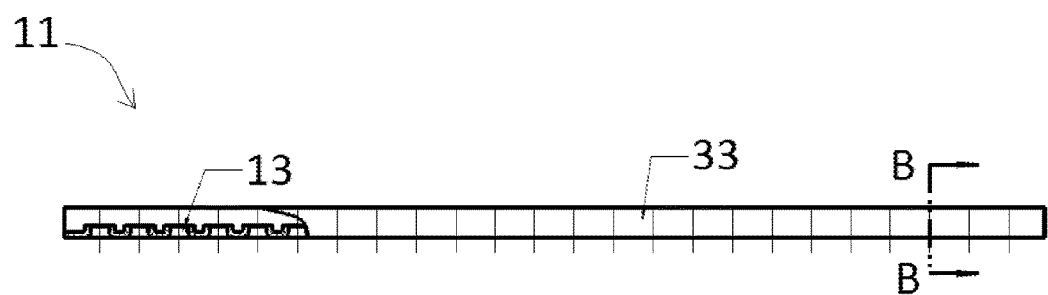
FIGS. 6 to 9 illustrate an improved main header of a CAC of an internal combustion engine according to an embodiment of the present disclosure.
Figure 7:
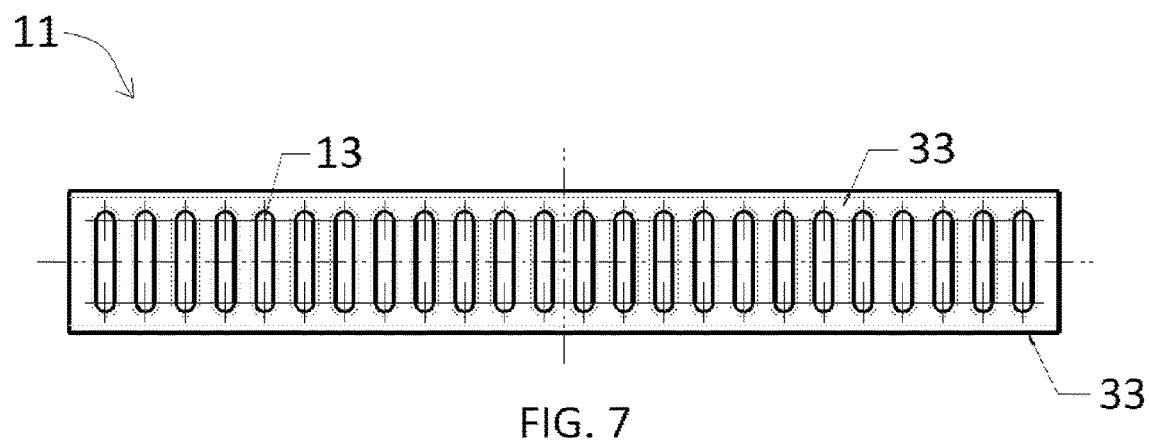
Figure 8:
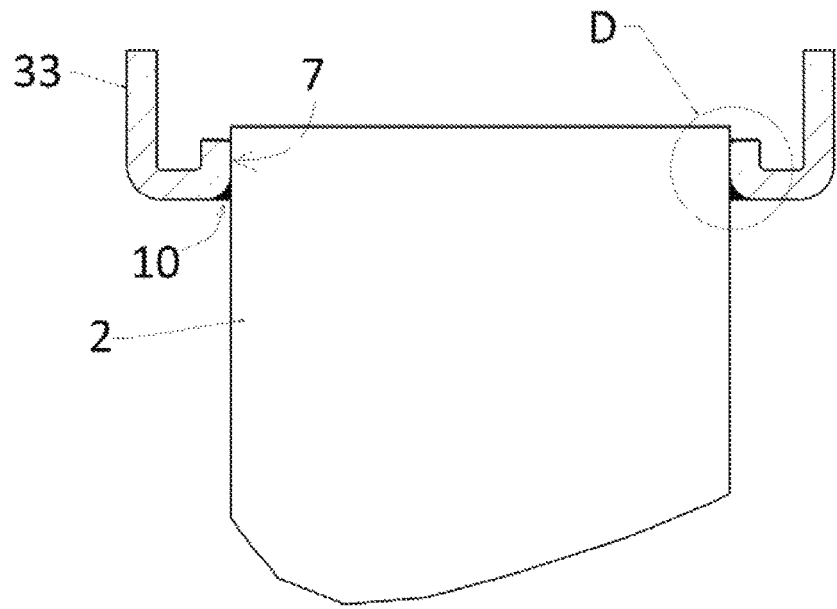

FIGS. 6 to 9 illustrate an improved main header of a CAC of an internal combustion engine according to an embodiment of the present disclosure. FIG. 6 is a cross-sectional view of a punctured type main header 11 according to one aspect of the present disclosure. FIG. 7 is a top view of FIG. 6. FIG. 8 is a partial enlarged view of the area C in FIG. 6. The main header 11 has a plurality of mounting holes 13 formed on a surface of the main header 11. The mounting holes 13 are evenly distributed along the length direction of the main header 11, as shown in FIGS. 6 and 7. The main header 11 may be formed from an aluminum plate having a thickness of 1.5 mm to about 3 mm. The mounting holes 13 can be formed by any suitable process such as drilling, stretching or puncturing. In one embodiment, the mounting holes 13 are formed by improved stretching process to be described below with respect to FIGS. 10 and 11.

Figure 9:
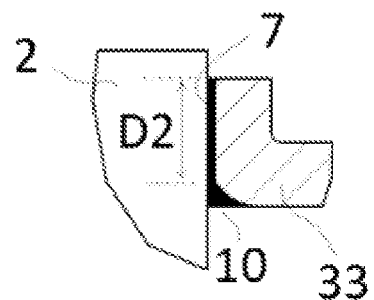

After the mounting holes 13 are formed, each mounting hole 13 is brazed to an aluminum tube 2, as shown in FIG. 8. In one embodiment, the sidewall 7 of the mounting hole 12 is provided with a conformal solder coating 10. Due to the presence of the solder coating 10 along the sidewall 7, the main header 11 and the aluminum tube 2 can be tightly brazed together after the brazing process. Particularly, the improved stretching process allows length of the sidewall 7 (having the solder coating 10) to be increased by at least 45% to 55% as compared to the conventional internal combustion engine shown in FIG. 4. As can be seen in FIG. 9, the increased dimension of the sidewall 7 offers greater brazing area, which in turn provides better brazing strength for the main header 11 and the aluminum tube 2. As a result, the issues of the CAC leakage caused by solder cracking and peeling due to a poor road condition is solved.

Figure 10:
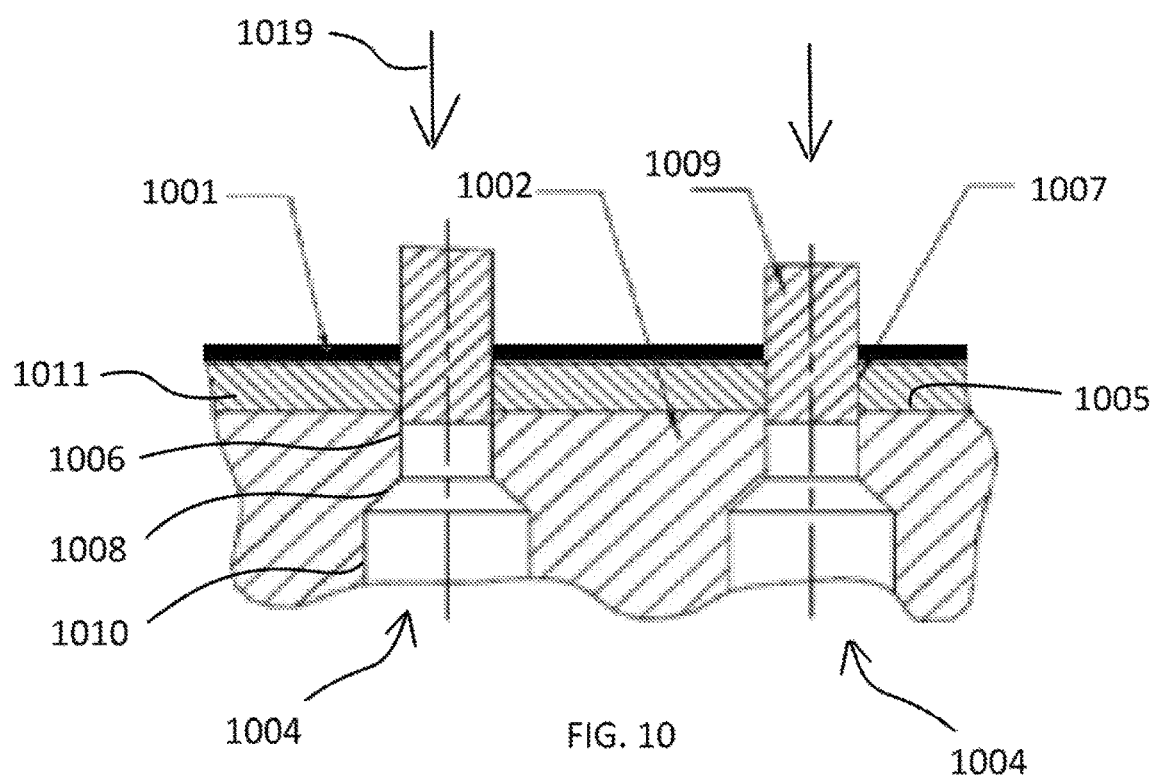
FIG. 10 illustrates a schematic cross-sectional view of a pre-punctured main header according to some embodiments of the present disclosure.

Embodiments below describe formation of holes in a main header using a two-step punching and die stretching process. This process can be used to form the mounting holes 13 for the main header 11 as discussed above. FIG. 10 is a schematic cross-sectional view of a punctured type main header during a die stretching process. The main header 1011, such as one used for forming the main header 11 of FIGS. 6 and 7, is placed on a concave die 1002 of a punching machine. In one example, the side of the main header 1011 having a solder coating 1001 is disposed facing the concave die 1002. Once the main header 1011 is placed on the concave die 1002, an upper die 1009 is moved downwardly using a downward force 1019 to form mounting holes 1007 in the main header 1011.

The concave die 1002 may have one or more through holes 1004 (only two are shown for clarity) formed in the concave die 1002 to allow passage of the waste punched materials. The through holes 1004 may have various profile. In one embodiment, each of the through holes 1004 has a first diameter 1006, a second diameter 1010, and a third diameter 1008 disposed between the first diameter 1006 and the second diameter 1010. The first diameter 1006 is located at or near a top surface 1005 of the concave die 1002. The third diameter 1008 gradually expands from the first diameter 1006 to the second diameter 1010, which is larger than the first diameter 1006.

Figure 11:
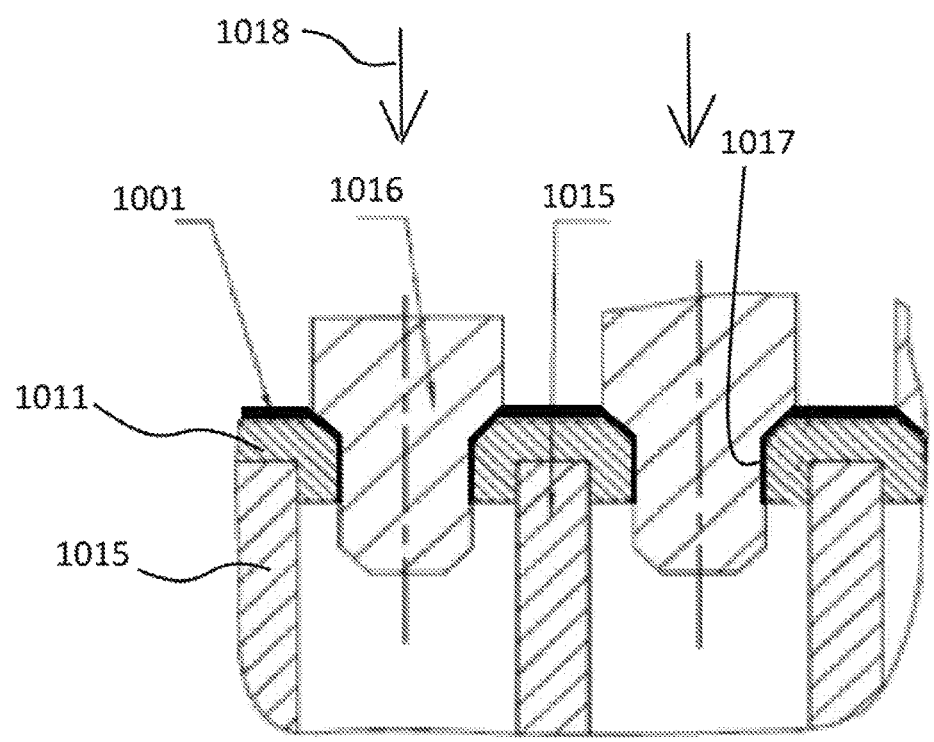
FIG. 11 is a schematic cross-sectional view of a punctured type main header during a die stretching process.

FIG. 11 illustrates a schematic cross-sectional view of a pre-punctured main header (i.e., the main header 1011 having the holes 1007) according to some embodiments of the present disclosure. The pre-punctured main header 1011 is placed on a stretch die 1015 with the solder coating 1001 facing up. Then, an upper die 1016 is moved downwardly using a downward force 1018 to stretch the mounting holes 1007. As a result, the mounting holes 1007 are created with elongated sidewall 1017 having the solder coating 1001 formed thereon. In some embodiments, the sidewall 1017 of the mounting holes 1007 may have a length "D2" of between about 3 mm and about 6 mm. In most cases, the length "D2" can be at least 45% to 55% longer than the length "D1" of the sidewall 5 of the conventional mounting holes 12 shown in FIG. 4. FIG. 9 illustrates an enlarged view of the elongated sidewall 1017 having the solder coating 1001 formed thereon.

The punctured type main header 1011 of the present disclosure is advantageous over the conventional main headers because the linear sections of the mounting holes 1007 are lengthened as compared to those of the conventional main headers. Therefore, the soldered area between each mounting hole and each aluminum tube 2 (FIG. 9) can be increased due to the elongated sidewall 1017. Meanwhile, since the elongated sidewall 1017 of the mounting hole 1007 formed using this process is provided with the solder coating 1001, the elongated sidewall 1017 can be much tightly brazed with the aluminum tube 2 and formed into one piece after the brazing process. As a result, the mounting holes 1007 of the main header 1011 can provide superior brazing strength and solve the hidden danger of CAC leakage caused by solder cracking and/or peeling off of the main header as would otherwise found in the conventional CAC.

Figure 12:
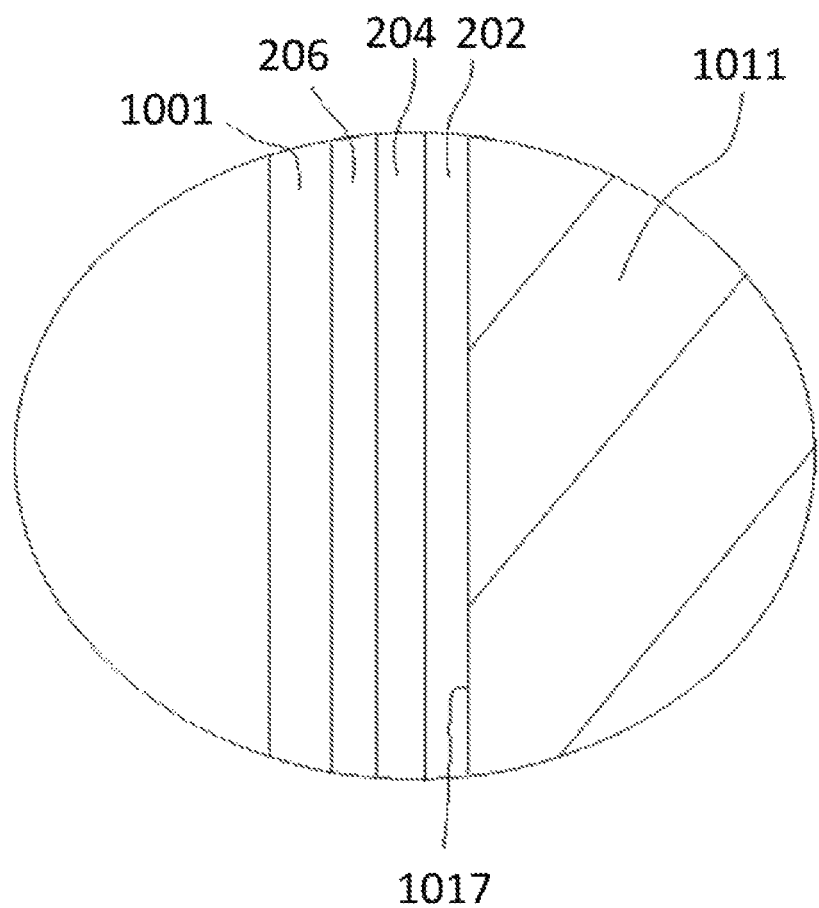
FIG. 12 illustrates a schematic cross-sectional view of adhesion layers between the solder coating and the main header according to some embodiments of the present disclosure.

In addition to the improved stretching process discussed above, it has been observed that the issues of the solder peeling from the main header can be further minimized or prevented by forming additional adhesion layers between the solder coating and the main header. For example, in some embodiments, a first feature layer 202 may be provided between the main header 1011 and the solder coating 1001, as shown in FIG. 12, which is a partial enlarged view of the area D in FIG. 8. The first feature layer 202 can be conformally formed on the linear section of the mounting hole 12 (e.g., elongated sidewall 1017 of the main header 1011 shown in FIG. 9). In some embodiments, the first feature layer 202 may have various sizes of voids or gas bubbles formed therein. The first feature layer 202 may be formed from glass. Suitable glass may include, but is not limited to soda-lime glass, lead glass, doped or un-doped silicon glasses such as borosilicate glass, aluminosilicate glass, aluminoborosilicate drawn glass, or titanium silicate glass, low-iron float glass, borofloat glass, aluminum oxynitride, acrylic glass, float glass, or other suitable sheet glasses.

In one embodiment, the first feature layer 202 is a thin glass layer formed of borosilicate glass. The voids or gas bubbles in the first feature layer 202 may be formed during the glass fusing stage, or at a later stage using any suitable techniques such as an ion-implantation process. In cases where gas bubbles are formed by ion-implantation of a gaseous species, gaseous species, such as oxygen and hydrogen, may be electrically accelerated with an energy sufficient to cause the oxygen and hydrogen to inject into the glass layer (i.e., the first feature layer 202) at a desired depth and concentration. Alternatively, the hydrogen may be added by exposing the glass layer to hydrogen plasma. The ion-implanted glass layer is then annealed to cause the oxygen and hydrogen to react to create steam, which expands to form voids or bubbles in the glass layer. In various examples, the gaseous species of the selected elements may be randomly distributed throughout the glass layer.

If desired, the implanted gaseous species may be injected into the glass layer (i.e., the first feature layer 202) to form a gradational concentration of the element phase (not shown). In one example, the resulting gas bubbles may have a gradational higher concentration at a level adjacent to the top surface of the glass layer and a gradational lower concentration away from the top surface of the glass layer (or vice versa). Various gaseous species may be used for the ion implantation process, which may include, but not limited to oxygen, nitrogen, argon, helium, aluminum, etc. Ion implantation energies may vary upon the application to produce a desired element concentration.

In some cases, a second feature layer 204 may be further formed on the first feature layer 202. The second feature layer 204 is a high performance material (HPM) that may be produced from raw ceramic powders of $Y_2O_3$, $Al_2O_3$, and $ZrO_2$. In one exemplary example, the second feature layer 204 is formed of $Y_2O_3$ in a range between about 45 mol. % and about 100 mol. % $ZrO_2$ in a range from about 0 mol. % and about 55 mol. %, and $Al_2O_3$ in a range from about 0 mol. % to about 10 mol. %. In one exemplary example, the second feature layer 204 may be formed of $Y_2O_3$ in a range between about 30 mol. % and about 60 mol. % $ZrO_2$ in a range from about 0 mol. % and about 20 mol. %, and $Al_2O_3$ in a range from about 30 mol. % to about 60 mol. %.

In some cases, the second feature layer 204 is composed of at least a compound $Y_xZr_yAl_zO$. The second feature layer 204 may have a graded composition across its thickness. In one exemplary example, the second feature layer 204 may contain $Y_2O_3$ having a molar concentration gradually changing from about 40 mol. % to about 85 mol. %, for example about 50 mol. % to about 75 mol. %, $ZrO_2$ having a molar concentration gradually changing from 5 mol. % to about 60 mol. %, for example about 10 mol. % to about 30 mol. %, and $Al_2O_3$ having a molar concentration gradually changing from 5 mol. % to about 50 mol. %, for example about 10 mol. % to about 30 mol. %. In another exemplary example, the second feature layer 204 may contain $Y_2O_3$ having a molar concentration gradually changing from about 55 mol. % to about 65 mol. %, $ZrO_2$ having a molar concentration gradually changing from 10 mol. % to about 25 mol. %, and $Al_2O_3$ having a molar concentration gradually changing from 10 mol. % to about 20 mol. %. In yet another exemplary example, the ceramic coating 214 may contain $Y_2O_3$ having a molar concentration gradually changing from about 55 mol. % to about 65 mol. %, $ZrO_2$ having a molar concentration gradually changing from 20 mol. % to about 25 mol. %, and $Al_2O_3$ having a molar concentration gradually changing from 5 mol. % to about 10 mol. %.

In some cases, the first feature layer 202 is a polyurethane material to provide required thermal absorptivity properties. The first feature layer 202 may be formed from other heat absorptive material, such as a carbon black paint or graphite.

In some cases, the first feature layer 202 may be omitted. That is, the second feature layer 204 is formed between the main header 11 and the solder coating 10.

In some cases, a third feature layer 206 may be further provided between the second feature layer 204 and the solder coating 10. The third feature layer 206 is a silicon-containing layer. The silicon-containing layer may be formed by an atomic layer epitaxy (ALE) or atomic layer deposition (ALD) processes. In cases where ALE is adapted, the third feature layer 206 may be formed by sequentially exposed to a first precursor gas, a purge gas, a second precursor gas, and a purge gas. The first and second precursor gases react to form a chemical compound as a film on the surface of the second feature layer 204. This cycle is repeated to grow the silicon-containing layer in a layer-by-layer fashion until a desired thickness is reached. The silicon-containing layer may have a thickness of about 1 nm to about 5 nm, for example about 2 nm to about 3 nm.

In various embodiments, the first precursor gas and the second precursor gas may be silicon-containing gases. Suitable silicon-containing gases may include one or more of silanes, halogenated silanes or organosilanes. Silanes may include silane ($SiH_4$) and higher silanes with the empirical formula $Si_xH_{(2x+2)}$, such as disilane ($Si_2H_6$), trisilane ($Si_3H_5$), and tetrasilane ($Si_4H_{10}$), or other higher order silane such as polychlorosilane. Halogenated silanes may include compounds with the empirical formula $X'_ySi_xH_{(2x+2-y)}$, where X'=F, Cl, Br or I, such as hexachlorodisilane ($Si_2Cl_6$), tetrachlorosilane ($SiCl_4$), dichlorosilane ($Cl_2SiH_2$) and trichlorosilane ($Cl_3SiH$). Organosilanes may include compounds with the empirical formula $R_ySi_xH_{(2x+2-y)}$, where R=methyl, ethyl, propyl or butyl, such as methylsilane (($CH_3$)$SiH_3$), dimethylsilane (($CH_3$)$_2SiH_2$), ethylsilane (($CH_3CH_2$)$SiH_3$), methyldisilane (($CH_3$)$Si_2H_5$), dimethyldisilane (($CH_3$)$_2Si_2H_4$) and hexamethyldisilane (($CH_3$)$_6Si_2$). Suitable germanium-containing gases may include, but are not limited to germane ($GeH_4$), digermane ($Ge_2H_6$), trigermane ($Ge_3H_5$), or a combination of two or more thereof. In some embodiments, tetraethylorthosilicate (TEOS) may also be used as the first or second precursor gas.

In one exemplary embodiment, the first precursor gas is a silicon-based precursor gas such as silane ($SiH_4$) or higher silanes with the empirical formula $Si_xH_{(2x+2)}$, such as disilane ($Si_2H_6$), trisilane ($Si_3H_6$), or tetrasilane ($Si_4H_{10}$). If desired, the first precursor gas may include one or more of the silicon-based precursor gases described herein. The second precursor gas is a halogenated silane, for example a chlorinated silane, such as monochlorosilane ($SiH_3Cl$, MCS), dichlorosilane ($Si_2H_2Cl_2$, DCS), trichlorosilane ($SiHCl_3$, TCS), hexachlorodisilane ($Si_2Cl_6$, HODS), octachlorotrisilane ($Si_3Cl_8$, OCTS), or silicon tetrachloride (STC). If desired, the second precursor gas may include one or more of the halogenated silanes described herein. Suitable purge gas may include helium, argon, nitrogen, hydrogen, forming gas, or combinations thereof.

In some cases, a third precursor gas may be co-flowed with the first precursor gas and/or second precursor gas during the ALE process. The third precursor gas may be a germanium-containing gas comprises germane ($GeH_4$), digermane ($Ge_2H_6$), trigermane ($Ge_3H_8$), germanium tetrachloride ($GeCl_4$), dichlorogermane ($GeH_2Cl_2$), trichlorogermane ($GeHCl_3$), hexachlorodigermane ($Ge_2Cl_6$), or any combination thereof.

In one exemplary example using ALE process, the first precursor gas is disilane and the second precursor gas is HODS. The ALE process is performed at a temperature range of about 350° C. to about 550° C., such as about 375° C. to about 450° C., for example about 425° C., and a chamber pressure of about 1 Torr to about 500 Torr, such as about 20 Torr to about 200 Torr, for example about 100 Torr.

While the foregoing is directed to embodiments of the present disclosure, other and further embodiments of the disclosure may be devised without departing from the basic scope thereof.

The invention claimed is:

1. A punctured type main header of an internal combustion engine CAC, comprising:
   a body having multiple mounting holes disposed in the length direction of the body, wherein each mounting hole has an elongated sidewall formed by a die stretching process;
   an aluminum tube coupled to each mounting hole;
   a first feature layer formed on the elongated sidewall of each mounting hole, wherein the first feature layer has gas bubbles formed therein, and the gas bubbles are formed by subjecting the first feature layer to an ion-implantation process using gaseous species containing oxygen and hydrogen and then to an anneal process;

a second feature layer formed on the first feature layer, the second feature layer is a high performance material (HPM) produced from raw ceramic powders of $Y_2O_3$, $Al_2O_3$, and $ZrO_2$; and a solder coating formed on the second feature layer.

2. The punctured type main header of claim 1, wherein the first feature layer is a borosilicate glass.

3. The punctured type main header of claim 1, wherein the body further comprising:

a third feature layer formed on the second feature layer, the third feature layer is a silicon-containing layer.

4. A punctured type main header of an internal combustion engine CAC, comprising:

a body having multiple mounting holes disposed in the length direction of the body, wherein each mounting hole has an elongated sidewall;

an aluminum tube coupled to each mounting hole;

a first feature layer formed on the elongated sidewall of each mounting hole, wherein the first feature layer has gas bubbles formed therein, and the gas bubbles has gradational higher concentration at a level adjacent to a top surface of the first feature layer and a gradational lower concentration away from the top surface of the first feature layer;

a second feature layer formed on the first feature layer, the second feature layer comprising $Y_2O_3$ having a molar concentration gradually changing from about 40 mol. % to about 85 mol. %;

a silicon-containing layer formed on the second feature layer; and a solder coating formed on the silicon-containing layer.

5. The punctured type main header of claim 4, wherein the first feature layer is a borosilicate glass.

\* \* \* \* \*